United States Patent [19]

Harshbarger et al.

[11] Patent Number: 4,518,995
[45] Date of Patent: * May 21, 1985

[54] SELECTABLE RATE SYNC GENERATOR SYSTEM

[75] Inventors: John H. Harshbarger, Xenia; William M. Shores, Dayton, both of Ohio

[73] Assignee: Visual Information Institute, Inc., Xenia, Ohio

[*] Notice: The portion of the term of this patent subsequent to Nov. 22, 2000 has been disclaimed.

[21] Appl. No.: 548,226

[22] Filed: Nov. 2, 1983

Related U.S. Application Data

[62] Division of Ser. No. 196,154, Oct. 10, 1980, Pat. No. 4,417,275.

[51] Int. Cl.³ .......................... H04N 7/02; H04N 5/06
[52] U.S. Cl. ................................... 358/139; 358/150; 328/187
[58] Field of Search ................. 358/139, 150; 328/187

[56] References Cited

U.S. PATENT DOCUMENTS

| | | | |
|---|---|---|---|
| 3,359,367 | 12/1967 | Hiatt, Jr. | 358/150 |
| 3,582,963 | 6/1971 | Bennet | 358/150 |
| 3,777,063 | 12/1973 | Meacham | 358/150 |
| 4,316,219 | 2/1982 | Smith et al. | 358/150 |
| 4,417,275 | 11/1983 | Harshbarger et al. | 358/139 |

Primary Examiner—John C. Martin
Assistant Examiner—John K. Peng
Attorney, Agent, or Firm—Jeffers, Irish & Hoffman

[57] ABSTRACT

A selectable rate sync generator system for use with a television test pattern generator includes a master oscillator of predetermined frequency, selector switches for selecting the desired total horizontal line time, and a horizontal line trigger circuit for generating a train of clock pulses having twice the repetition rate (2H) of the line time selected. H rate blanking and drive pulses are generated in response to the clock pulses. Selector switches are provided for selecting a desired number of horizontal scanning lines in two fields, and a vertical trigger circuit generates vertical trigger pulses having the repetition rate (V) of the number of lines selected. V rate blanking and drive pulses are generated in a response to the V trigger pulses, and the H and V rate blanking pulses are summed to provide a composite blanking signal. H rate sync pulses are generated in a response to the clock pulses and are delayed therefrom by a predetermined interval. V rate sync pulses are generated in a response to the V rate blanking pulses, and the H and V sync pulses are summed to provide a composite sync signal.

5 Claims, 18 Drawing Figures

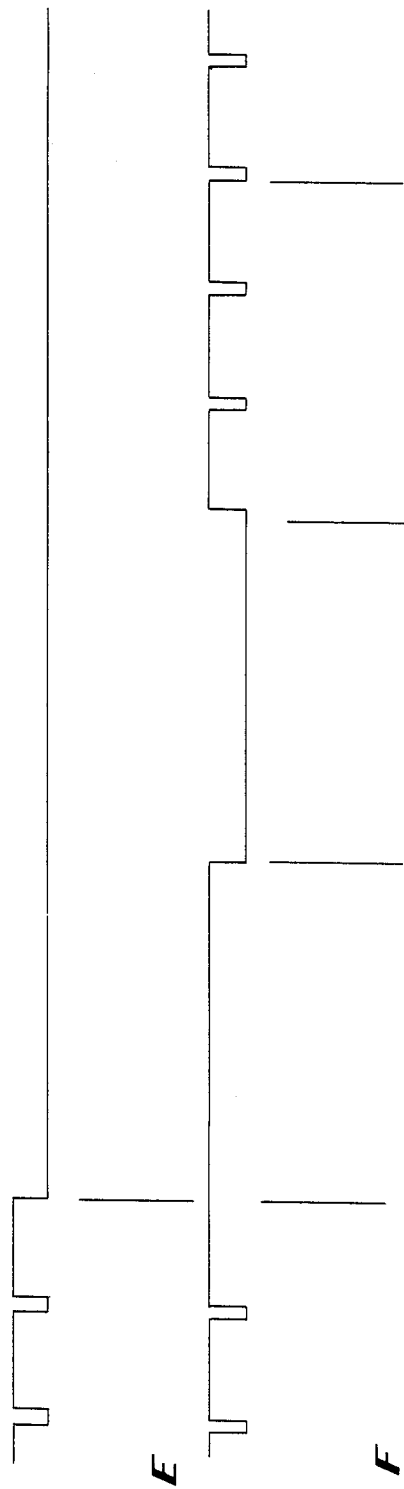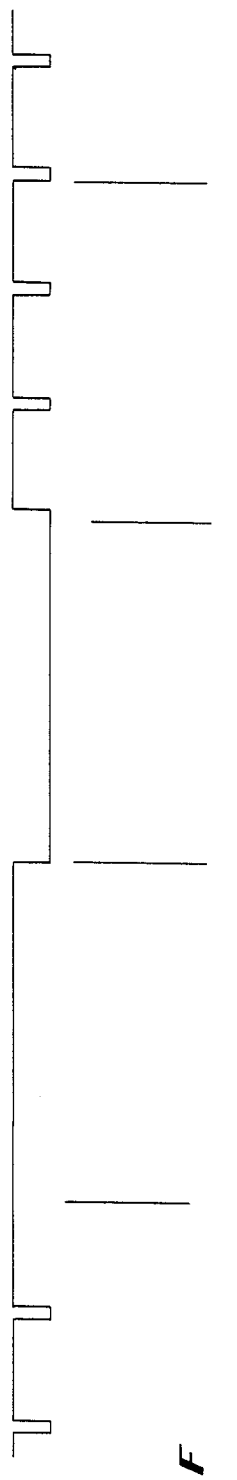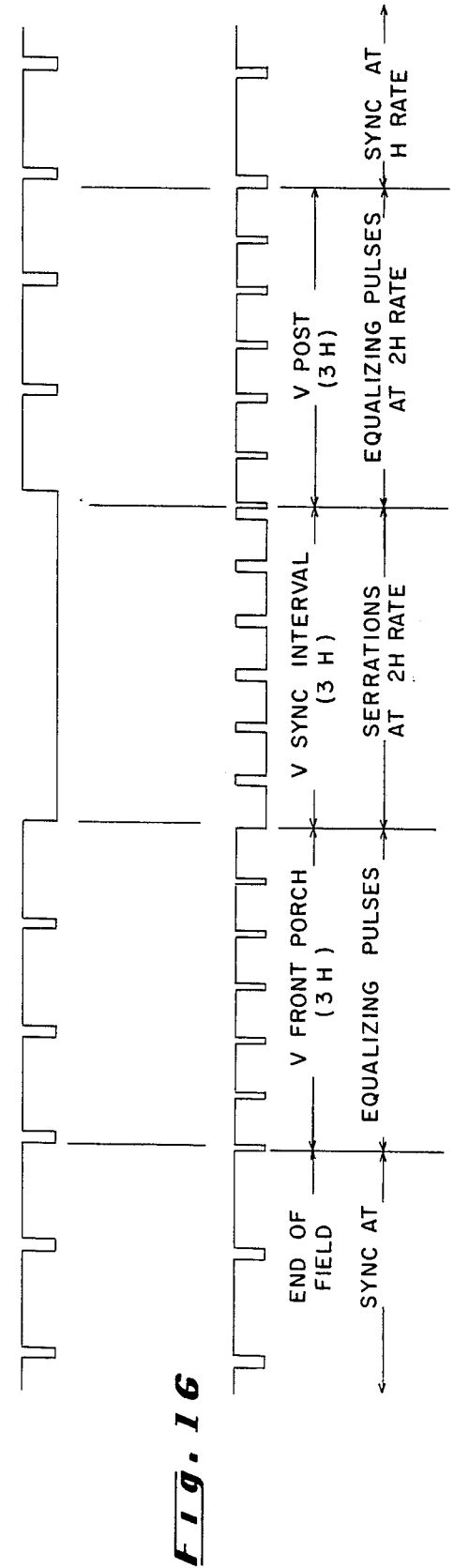

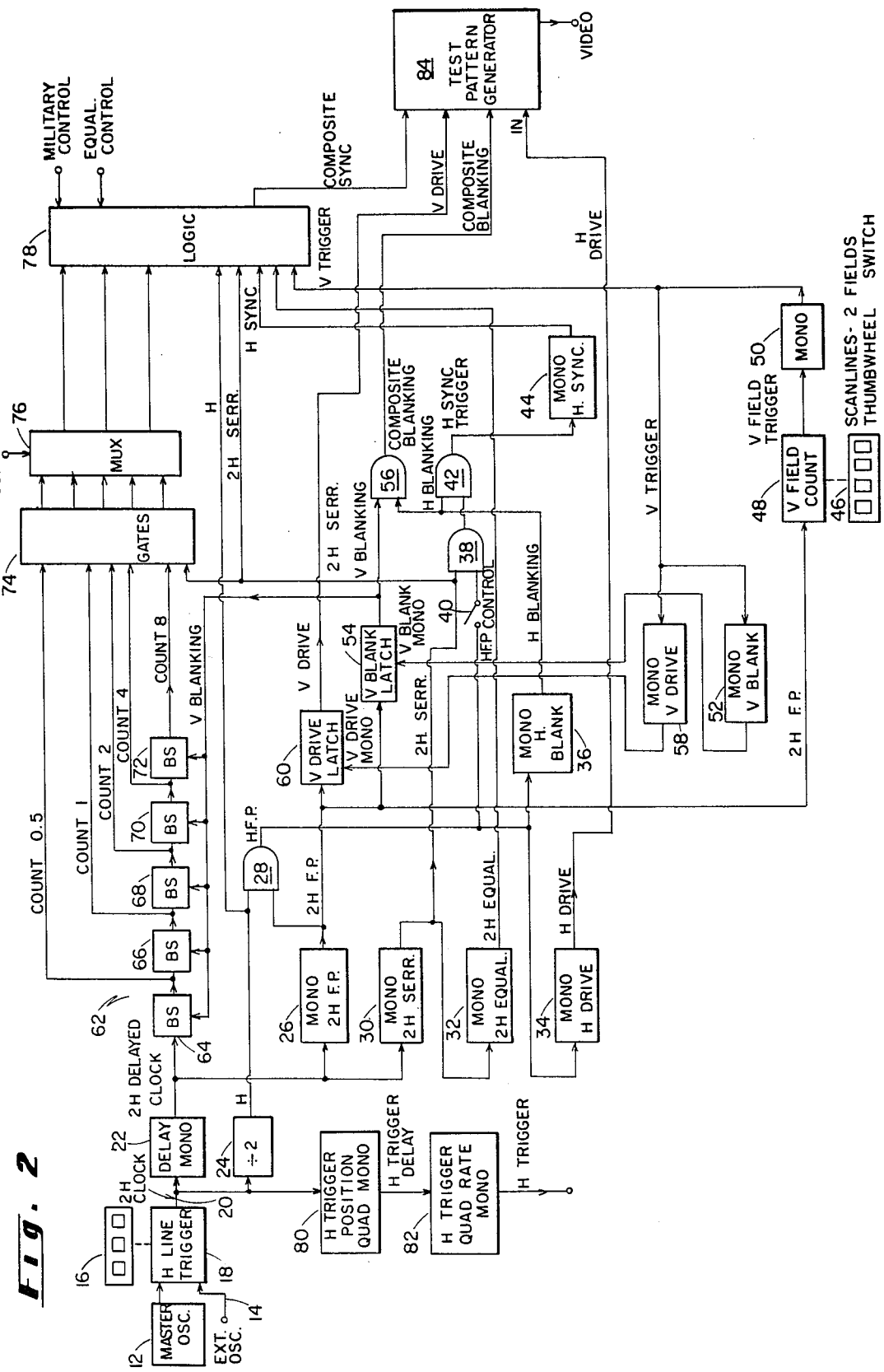

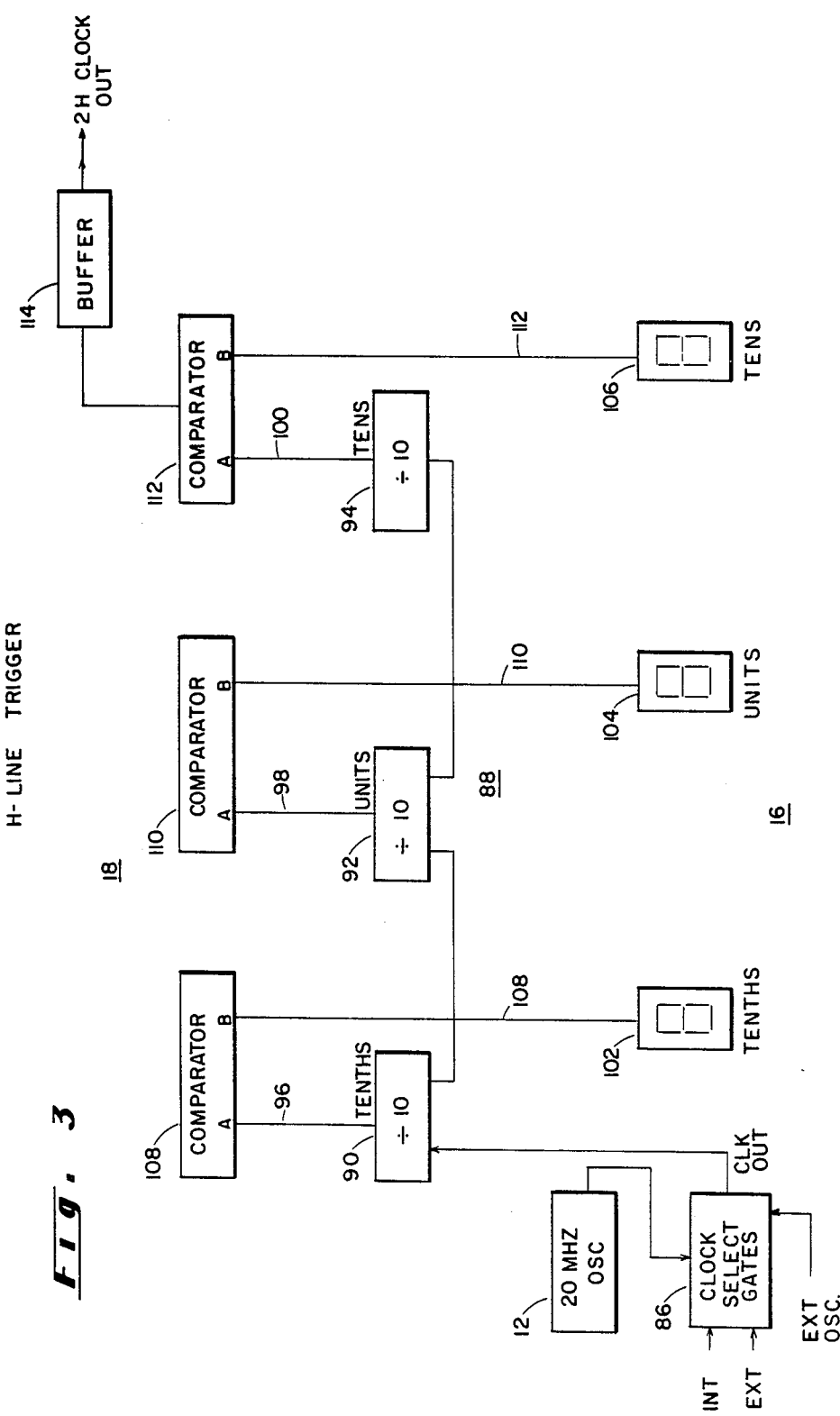

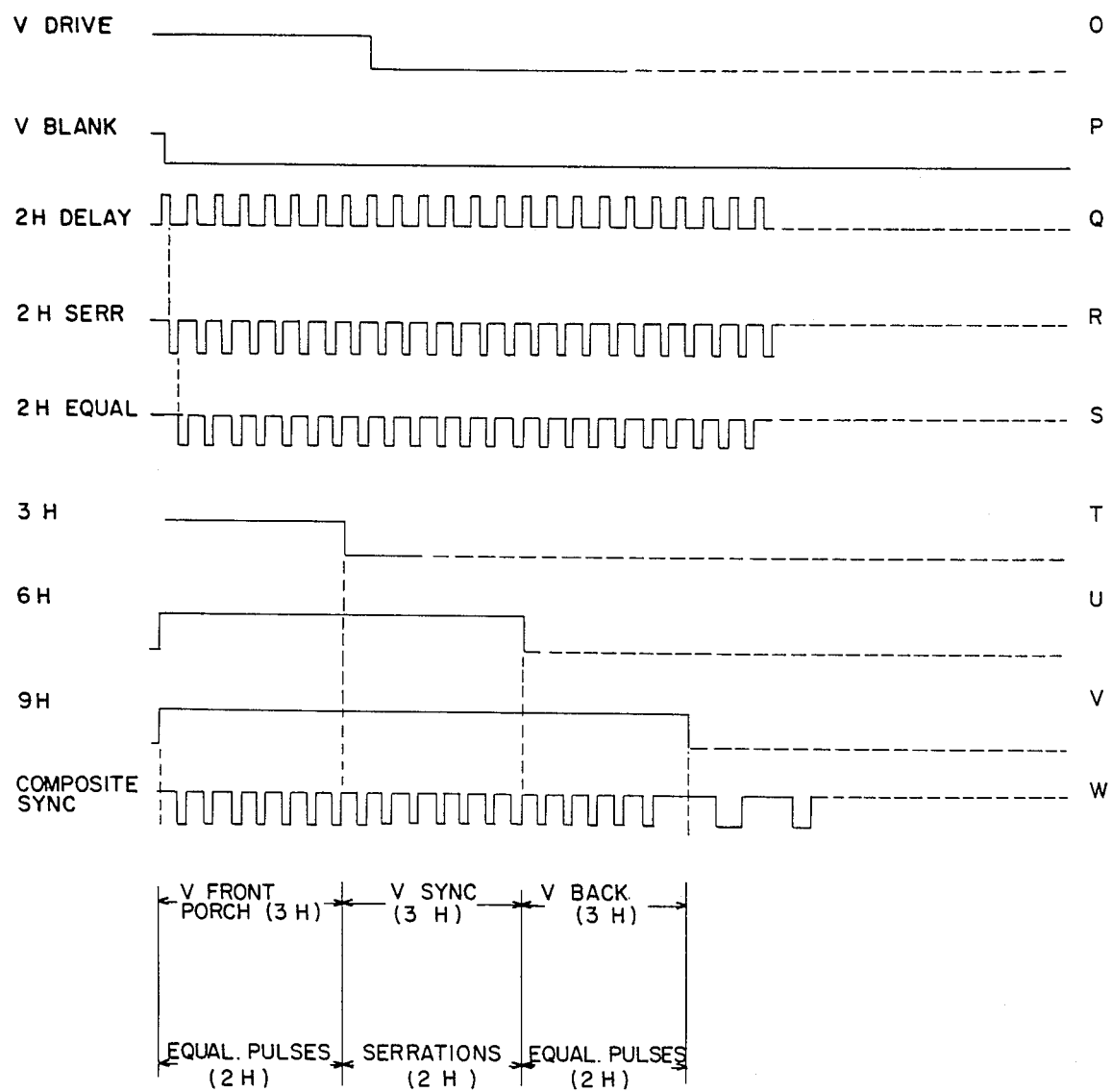

SELECTABLE RATE SYNC GENERATOR SYSTEM

This is a division of application Ser. No. 196,154, filed Oct. 10, 1980, now U.S. Pat. No. 4,417,275, issued on Nov. 22, 1983.

BACKGROUND OF THE INVENTION

1. Field of the Invention

This invention relates generally to television synchronizing signal generators, and more particularly to a selectable rate sync generator system for use with a television test pattern generator.

2. Description of the Prior Art

Television test pattern generators are used to generate a variety of video test patterns which may be transmitted in the case of broadcast television to permit adjustment of a television receiver, or which may be used in the manufacture and service of television receivers and/or transmitting equipment. Typical test pattern generator systems are shown, for example, in the U.S. Pat. Nos. 4,149,178; 4,093,960; 3,917,902; 3,879,749 and 3,019,289.

Conventional television test pattern generators require composite, horizontal and vertical sync, composite, horizontal and vertical blanking, and horizontal and vertical drive inputs, and provide a video signal output. H drive is a pulse train in which a pulse starts at the end of every television scanning line, its function being to mark the time interval between the end of one line and the start of another line. The H drive pulses may be used to control the horizontal deflection "flyback" and other signal processing. The H drive pulse train is continuous and uninterrupted even during the vertical synchronizing interval, and the H drive pulses are useful for synchronizing an oscilloscope when inspecting the television wave form at the horizontal line rate. The V drive is a pulse train in which a pulse starts at the end of each television field, its function being to mark the time interval between the end of one television field and the next. The V drive pulses may be used to control the vertical deflection "flyback" and other signal processing, and are useful for synchronizing an oscilloscope when inspecting the television wave form at vertical field rate. Blanking is a mixture of horizontal and vertical information used to control the "blackout" of a television system during deflection return or "flyback" between horizontal lines and vertical fields. The blanking pulses are wider than drive and sync pulses in order to insure that all transitions are invisible, i.e. blanked. Sync is a complex combination of horizontal and vertical pulse information used to control the decoding of a television signal by the display device, recorder or other type of video processing equipment. Sync is usually mixed with the video information to produce a composite picture signal.

Different types of television systems, e.g. domestic broadcast, foreign broadcast, industrial and military, operate at many different scanning rates. Complete specification of the scan rate requires information as to the horizontal scanning line repetition rate (usually expressed in kHz), the number of scanning lines to be developed in each television field, the number of television fields which make up a complete frame, and the width of pulses present within the various synchronizing wave forms.

The format of H drive, V drive and blanking is the same for all scanning rates, however, the sync wave form can occur in any one of three formats e.g. broadcast, industrial and military. In the broadcast system, the vertical sync pulse interval is preceded by a front porch interval and followed by a back porch interval, each having a duration of three scanning line intervals. Six 2H rate equalizing pulses are superimposed on the sync signal during the front porch and back porch intervals, i.e. six equalizing pulses during each such interval, and six 2H rate serration pulses are superimposed on the vertical sync pulse. Domestic broadcast sync also includes horizontal front porch intervals preceding the horizontal sync pulses.

The sync for industrial television is the same as broadcast television except for the omission of the equalizing pulses and serration pulses. The sync for military television does not include equalizing and serration pulses, has no horizontal front porch, and no horizontal rate pulse information during the vertical front porch interval of three scanning lines.

The scan rate is determined by the number of scan lines per field and the desired field repetition rate. Most television systems are "interlaced" to avoid a visible flicker in the display, usually at a 2:1 ratio; 2:1 interlaced ratio means that two entire display "fields" must be developed to generate one complete "frame" or image. In the United States, field and frame rates are 60 Hz and 30 Hz respectively, whereas in countries having 50 Hz power including the European countries and Japan, the field and frame rates are 50 Hz and 25 Hz, respectively. Television operation without interlacing, commonly referred to as 1:1 interlace, is also fairly common.

Conventional sync generator circuits for test pattern generators have typically provided only one scanning rate, depending upon the type of television system with which the test pattern generator is to be used. It is therefore desirable to provide a selectable rate sync generator in which the scanning rate may be selected over a wide range.

SUMMARY OF THE INVENTION

The selectable rate sync generator system of the invention selects the desired scan rate by selection of the total horizontal line time and the number of scan lines which are to occur in two fields, regardless of the number of fields which make a frame. The horizontal repetition rate is usually specified or can be calculated easily. For instance, at the United States broadcast scanning rate having 525 scan lines per frame with 2:1 interlacing, i.e. 60 Hz field rate and a 30 Hz field rate, the horizontal repetition rate is 15.750 kHz and therefore, the line period or the time required for each line is 63.492 usec which may be rounded off to 63.5 usec. This total horizontal line time, 63.5 usec in the case of U.S. broadcast television, is selected by the total horizontal line time thumbwheel switch employed in the system of the invention which results in a 15.748 kHz horizontal rate. Another thumbwheel switch in the system of the invention is set for the number of scan lines in two fields desired, 0525 for the 525/60 scan rate used in the United States broadcast television.

The selectable rate sync generator system of the invention, in its broader aspects, comprises master oscillator means having a predetermined frequency, means for selecting the desired total horizontal line time, and means coupled to the oscillator means and to the selecting means for generating a train of clock pulses having twice the repetition rate (2H) of the line time selected. Means is provided for generating H rate blanking and drive pulses of predetermined duration in response to the clock pulses. Means is provided for selecting the desired number of horizontal scanning lines in two fields, and means is provided coupled to the clock pulse generating means and to the second selecting means for generating vertical trigger pulses having the repetition rate (V) of the number of lines selected. Means is provided for generating V rate blanking and drive pulses of predetermined duration in response to the trigger pulses, and means is provided for summing the H and V rate blanking pulses to provide a composite blanking signal. Means is provided for generating H rate sync pulses of predetermined duration in response to sync light pulses and delayed therefrom by a predetermined interval. Means is provided for generating V rate sync pulses having a predetermined duration in response to the V rate blanking pulses, and means is provided for summing the H and V rate sync pulses to provide a composite sync signal.

In the preferred embodiment, the total horizontal line time and the desired number of horizontal scanning lines in two fields are each converted to binary coded form, the cycles of the signal provided by the master oscillator means are counted in binary coded form and compared with the binary coded total line time selected, and the clock pulses are counted in binary coded form and compared with the binary coded number of scanning lines selected.

It is accordingly an object of the invention to provide an improved selectable rate sync generator system for use with a television test pattern generator.

Another object of the invention is to provide an improved method of generating selectable rate sync signals.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1D shows the composite horizontal and vertical blanking pulses in an expanded form;

FIG. 1E shows the composite sync signal generated by the system of the invention in the military format;

FIG. 1F shows the composite sync signal in the industrial format;

FIG. 1G shows the composite sync signal in the broadcast format;

FIG. 2 is a simplified schematic block diagram showing the system of the invention;

FIG. 3 is a simplified block diagram of the H-line trigger board;

FIGS. 11A and 11B are timing diagrams showing the pulses developed in the system of the invention and useful in explaining the invention.

DESCRIPTION OF THE PREFERRED EMBODIMENT

Figure 1A:
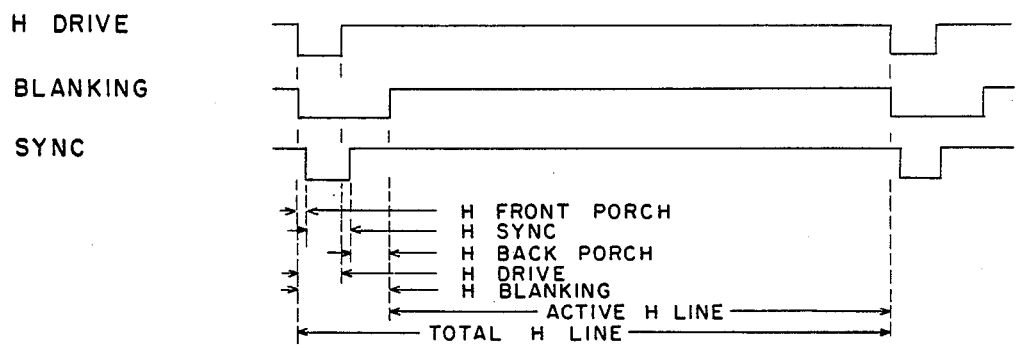
FIG. 1A shows the horizontal pulses generated by the system of the invention.
Figure 1B:
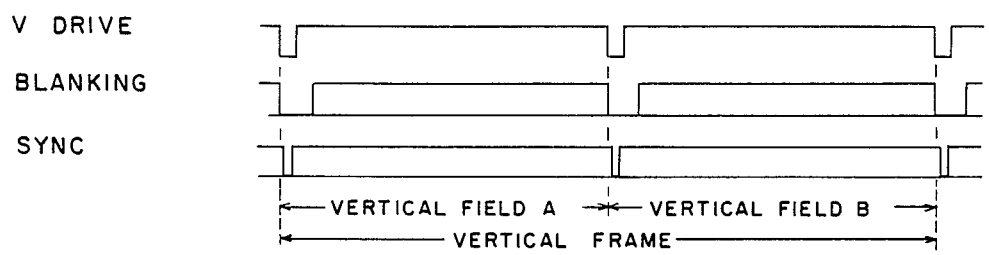
FIG. 1B shows the vertical pulses generated by the system of the invention.
Figure 1C:
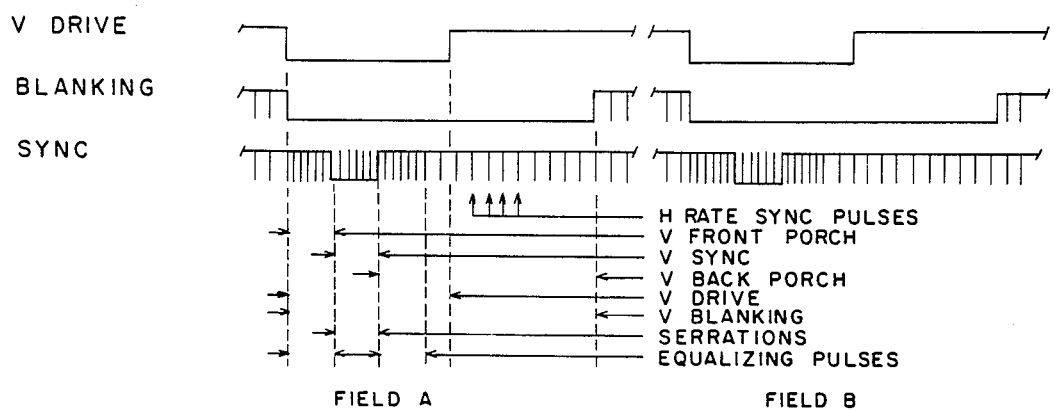
FIG. 1C shows the composite blanking and sync pulses generated by the system of the invention in the broadcast format.

Referring now to FIG. 2 of the drawings, conventional crystal controlled master oscillator 12 generates an alternating current signal at a predetermined frequency, such as 20 mHz. Input circuit 14 is also provided to permit connection of an external master oscillator operating at some other predetermined frequency. Thumbwheel selector switches 16 are used manually to select a desired total horizontal line time. Thumbwheel switches 16 are of the conventional type which convert the number selected to binary coded form. It will be readily understood that conventional keyboard switches having a binary coded output may be employed in lieu of thumbwheel switches.

H-line trigger circuit 18 counts the cycles of the alternating current signal generating by master oscillator 12, or the external oscillator, in binary coded form and compares that binary coded count with the binary coded total line time selected by selector switches 16 to provide in output circuit 20 a train of clock pulses having twice the repetition rate (2) of the line time selected. The 2H clock pulses are in the form of negative-going spikes, as shown at A in FIG. 11.

Figure 11A:
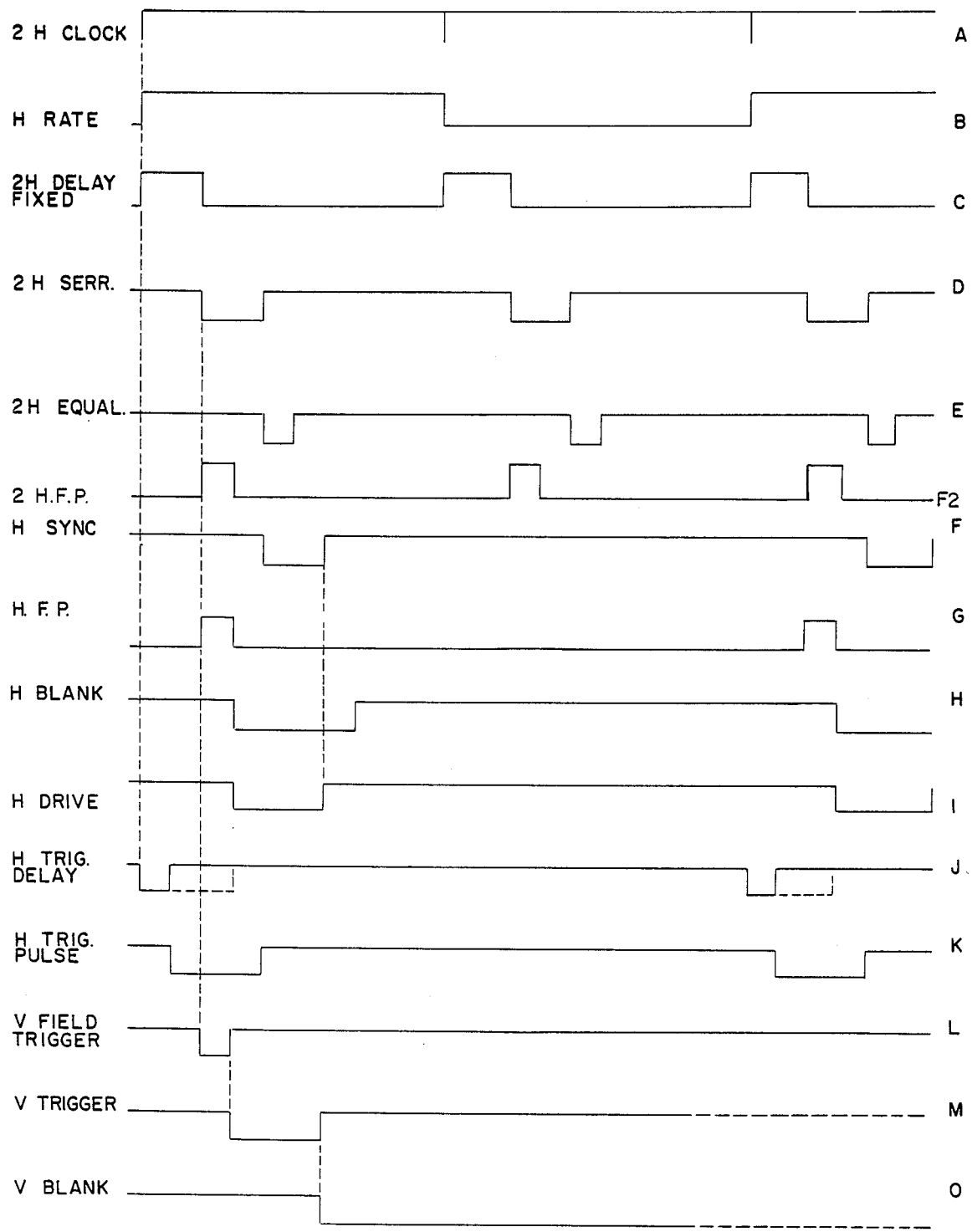

The 2H rate clock pulses are delayed by delay monostable multivibrator 22 to provide 2H delayed pulses as shown at C in FIG. 11. The 2H rate clock pulses are also divided by bistable multivibrator 24 to provide a train of H rate pulses as shown at B in FIG. 11.

The trailing edges of the 2H rate delayed clock pulses trigger quad rate monostable multivibrator 26 to provide 2H rate front porch pulses (F2 in FIG. 11) which are combined with the H rate clock pulses by gate 28 to provide H rate front porch pulses as shown at G in FIG. 11. The trailing edges of the 2H rate delayed clock pulses also trigger quad rate monostable multivibrator 30 to provide 2H rate serration pulses as shown at D in FIG. 11. The trailing edges of the 2H rate serration pulses trigger quad rate monostable multivibrator 32 to provide 2H rate equalizing pulses, as shown at E in FIG. 11.

The trailing edge of the H rate front porch pulses trigger quad rate monostable multivibrator 34 to provide H rate drive pulses as shown at I in FIG. 11. the trailing edges of the H rate front porch pulses also trigger quad rate monostable multivibrator 36 to provide H rate blanking pulses as shown at H in FIG. 11.

The 2H rate serration pulses are summed with the H front porch pulses at gate 38 to provide H rate serration pulses. In the event H front porch control 40 is open, the 2H rate serration pulses pass through gate 38. The 2H rate serration pulses, or the H rate serration pulses, are summed with the H rate blanking pulses at gate 42 to provide H-rate sync trigger pulses which, in turn, trigger quad rate monostable multivibrator 44 to provide H rate sync pulses, as shown in F in FIG. 11.

The desired number of scanning lines in two fields is selected by thumbwheel switches 46 which convert the number selected to binary coded form. The 2H rate front porch pulses are counted in binary coded form and compared with the binary coded number of scanning lines selected by V field count circuit 48 to provide V field trigger pulses, as shown at L in FIG. 11. The trailing edges of the V field trigger pulses trigger monostable multivibrator 50 to provide V trigger pulses as shown at M in FIG. 11.

The trailing edges of the V trigger pulses trigger monostable multivibrator 52 to provide V blank mono pulses which are applied to V blanking latch circuit 54 to initiate V blanking pulses as shown at N and P in FIG. 11, the V blanking pulses being terminated in response to 2H rate front porch pulses also applied to V blanking latch 54. The V blanking pulses are summed with the H blanking pulses at gate 56 to provide a composite H and V blanking signal.

The trailing edges of the V trigger pulses also trigger monostable multivibrator 58 to provide V drive mono pulses. The V drive mono pulses are applied to V drive latch 60 to initiate the V drive pulses, 2H front porch pulses also being applied to the V drive latch 60 to terminate the V drive pulses.

It will be understood that while monostable multivibrators 52, 58, essentially determine the pulse width of the V blanking and V drive pulses, the trailing edges of those pulse are extended to be coincident with a half-line (2H front porch) so as to avoid flutter or "flag waving" in the TV raster.

The 2H delayed clock pulses are counted by counting chain 62 comprising bistable multivibrators 64, 66, 68, 70, 72 to provide counts of 0.5, 01, 02, 04 and 08 in the presence of a B blanking pulse. These counts are gated by gate circuit 74, scanned by multiplexer 76, and applied to logic circuit 78 which determines the duration of the V front porch interval, the duration of the V sync pulse and the duration of the V back porch interval. In the U.S. Broadcast format, the V sync pulse is at all times delayed from the start of V blanking by a V front porch interval which is always 3H (the time of three horizontal lines), the V sync pulse is also exactly 3H in duration, and is followed by a V back porch interval which is also exactly 3H in duration, as shown at W in FIG. 11; in the European format, the V front porch and back porch intervals and the V sync pulse are 2.5H in duration. Thus, in the U.S. broadcast format, counts of 3H, 6H and 9H from counting chain 62 are employed to derive the V front porch, V sync pulse and V back porch intervals as shown at T, U and V in FIG. 11.

Logic circuit 78 also sums the negative-going 2H serration pulses with the composite signal during the V front porch and V back porch intervals, and sums the positive-going 2H equalizing pulses with the composite signal during the sync pulse, as shown at W in FIG. 11.

In the system of the invention as shown in FIG. 2, an H trigger pulse output is provided which is employed in the testing of CRT displays which do not have internal position controls. For this purpose, the 2H clock pulses are used to trigger H trigger position delay monostable multivibrator 80 which provides a selectively variable H trigger pulse, as shown at J in FIG. 11, the trailing edge of which triggers H trigger quad rate monostable multivibrator 82, as shown at K in FIG. 11.

Figure 10:
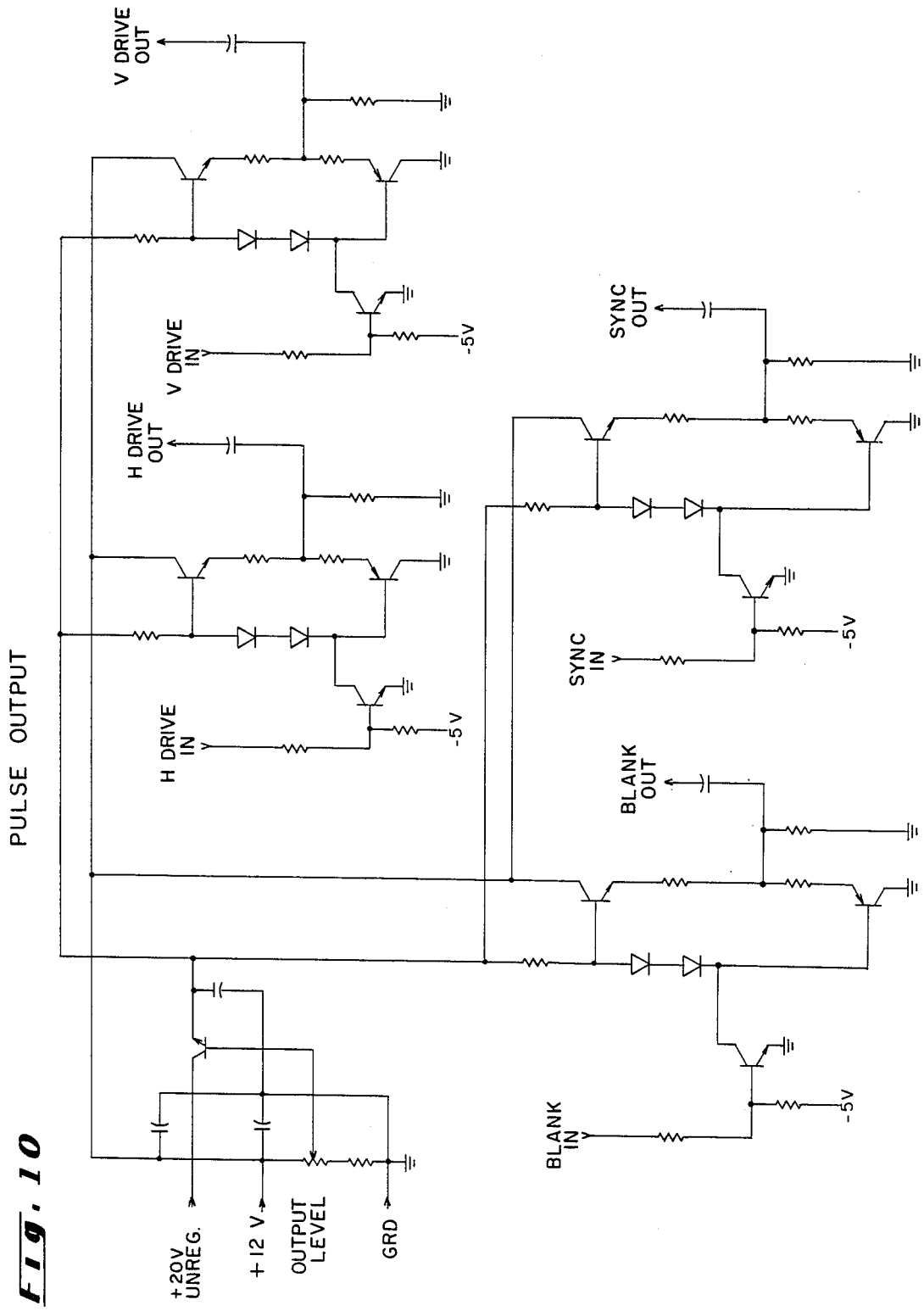
FIG. 10 is a schematic diagram of the pulse output board.

The composite sync signal provided by logic circuit 78, the composite blanking signal from gate 56, the V drive pulses from latch 60, and the H drive pulses from monostable multivibrator 34 are applied to the inputs of conventional test pattern generator 84, preferably via the pulse output drive circuit shown in FIG. 10 (but not shown in FIG. 2).

Referring now briefly to FIG. 3, master oscillator 12, or the external oscillator, are applied by clock select gates 86 to counting chain 88 comprising tenths, units and tens counters 90, 92, and 94 which count-down the cycles of the alternating current output of the oscillator and provide binary coded outputs in their output circuits 96, 98 and 100, respectively. Tenths units and tens thumbwheel switches 102, 104 and 106 of selector switch assembly 16 convert the length of line time selected to binary coded form in their output circuits 108, 110 and 112 respectively. The binary coded outputs from thumbwheel switches 102, 104 and 106 are compared with the binary coded outputs of counters 90, 92, and 94 by comparators 108, 110, 112, respectively, to provide a 2H clock output by way of conventional buffer circuit 114.

Figure 4:
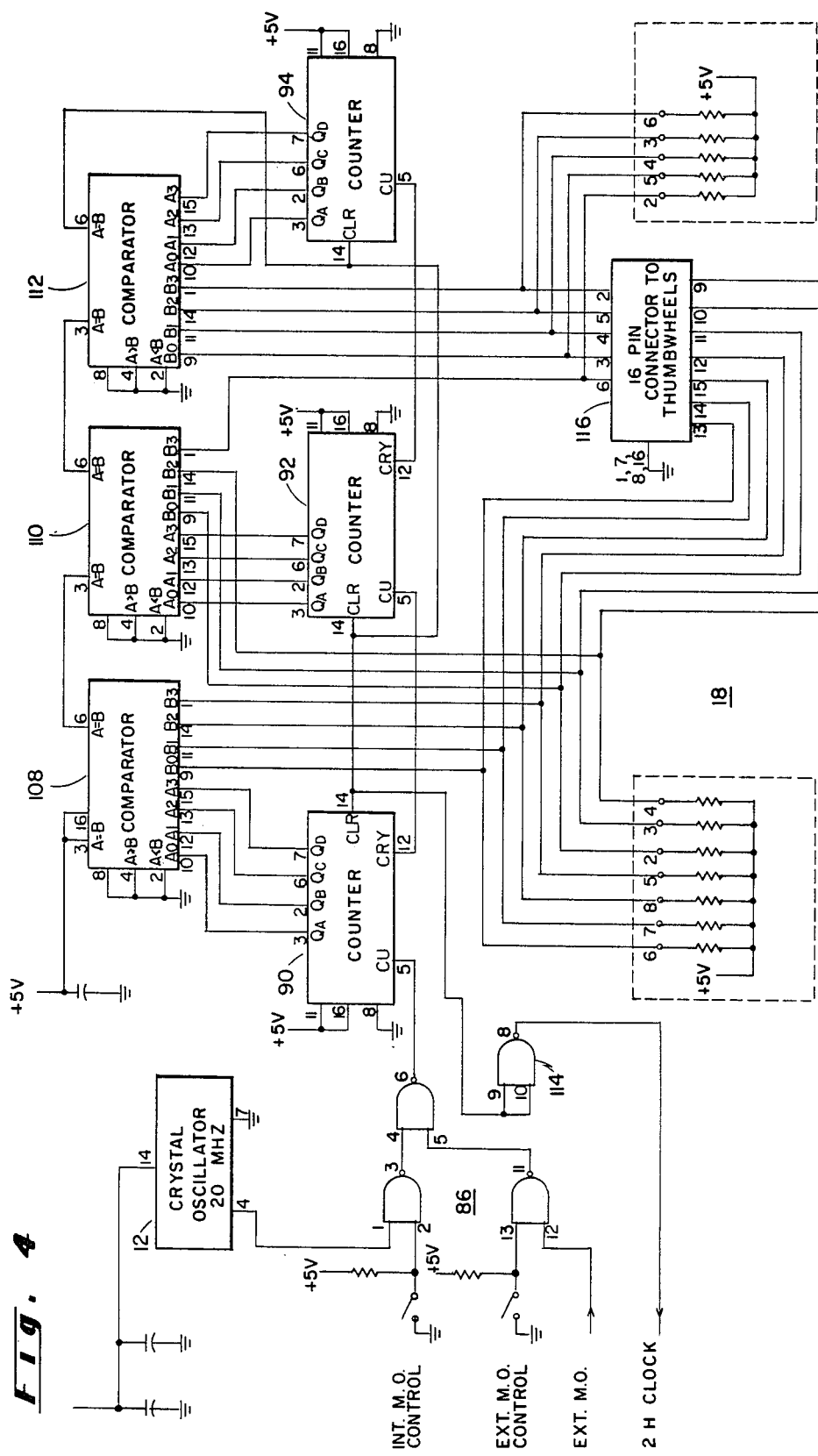
FIG. 4 is a schematic diagram of the H-line trigger board.

A schematic circuit for an actual physical embodiment of H line trigger board 18 is shown on FIG. 4. On that board the following integrated circuits were used:

| Crystal oscillator 12 | CA-238A |
|---|---|
| Counters 90, 92, 94 | 74192 |
| Comparators 108, 110, 112 | 74585 |
| Gates 86, 114 | 74 & 132 |

It will be understood that thumbwheel switches 102, 104, 106 (FIG. 3) have their leads respectively connected to connector 116 by a suitable mating connector.

Figure 5:
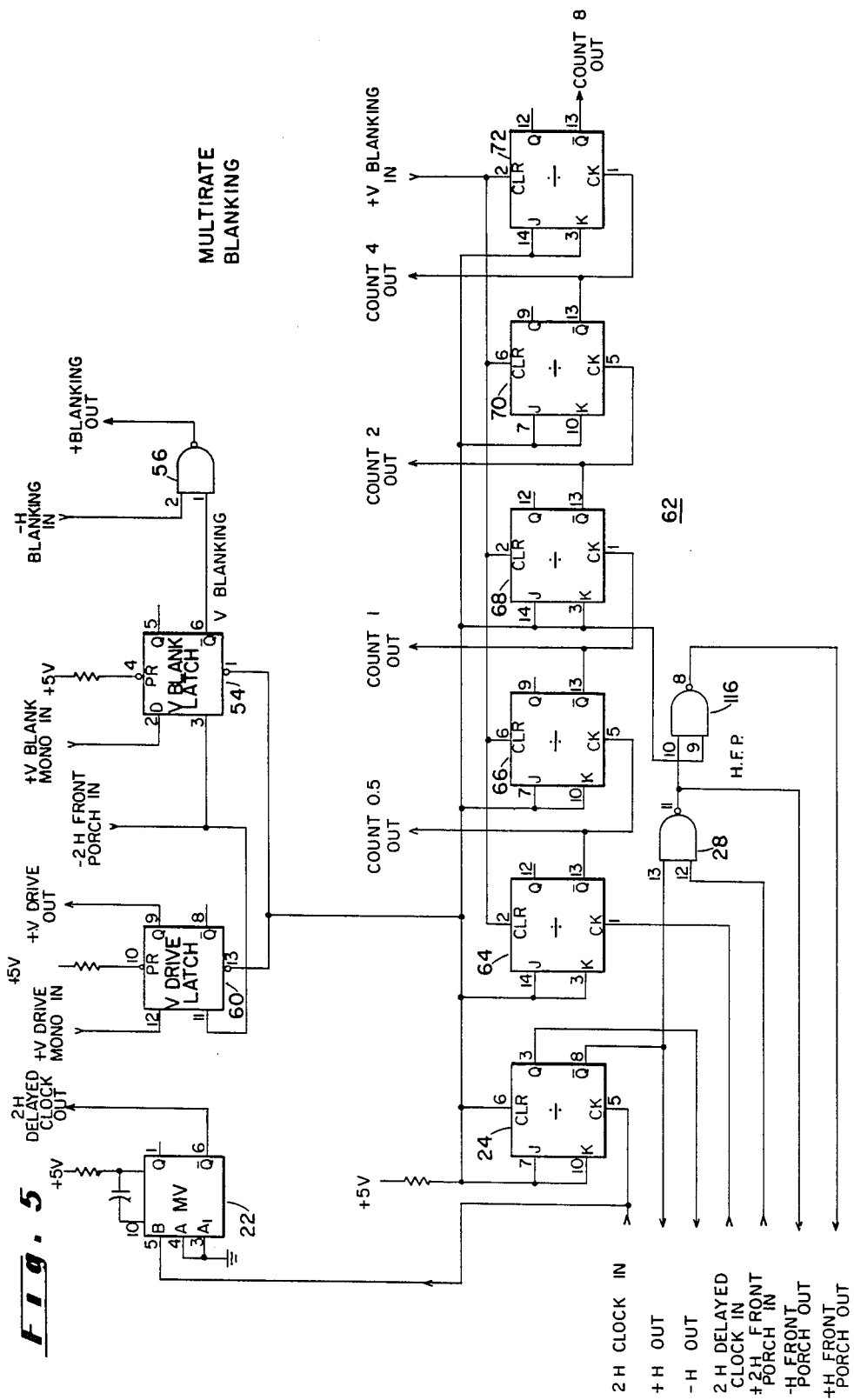
FIG. 5 is a schematic diagram of the multirate blanking board.

Referring now to FIG. 5, there is shown a schematic diagram of the multirate blanking board which includes the delay monostable multivibrator 22, V drive latch 60, V blanking latch 54, composite blanking gate 56, divide by two bistable multivibrator 24, bistable multivibrators 64, 66, 68, 70 and 72 comprising counting chain 62 and gate 28. In an actual physical embodiment of the system of the invention, the following integrated circuits were used in the multirate blanking board shown in FIG. 5:

| Multivibrator 22 | | 74121 |
|---|---|---|
| Latches 54, 60 | | 7474 |
| Bistable multivibrators | 24, 64, 66, 68, 70, 72 | 7473 |
| Gates 28, 56, 116 | | 7400 |

Figure 6:
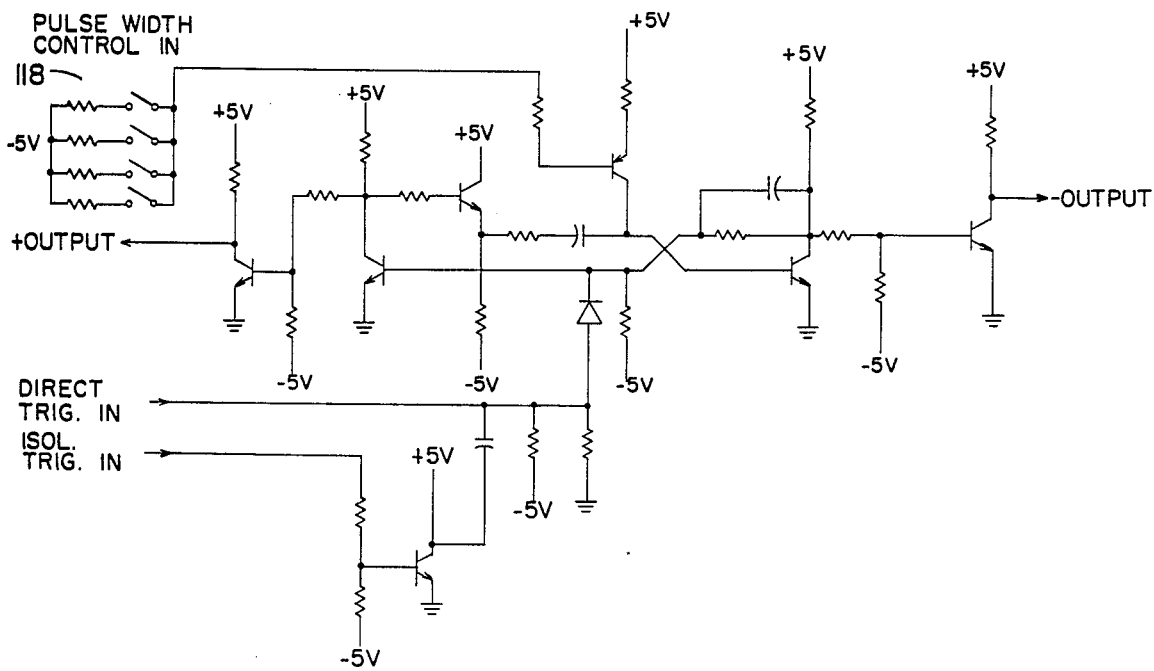
FIG. 6 is a schematic diagram of the quad rate monostable multivibrator circuits employed in the system of the invention.

Referring to FIG. 6, a schematic diagram is shown for the quad rate monostable multivibrators 26, 30, 32, 34, 36, 52, 58, 60, 80, 82. In the circuit shown, resistors shown schematically at 118 are employed selectively to determine the pulse width. The quad rate monostable multivibrator circuit shown at FIG. 6 is not our invention, per se, and other conventional monostable multivibrator configurations can equally advantageously be employed.

Figure 7:
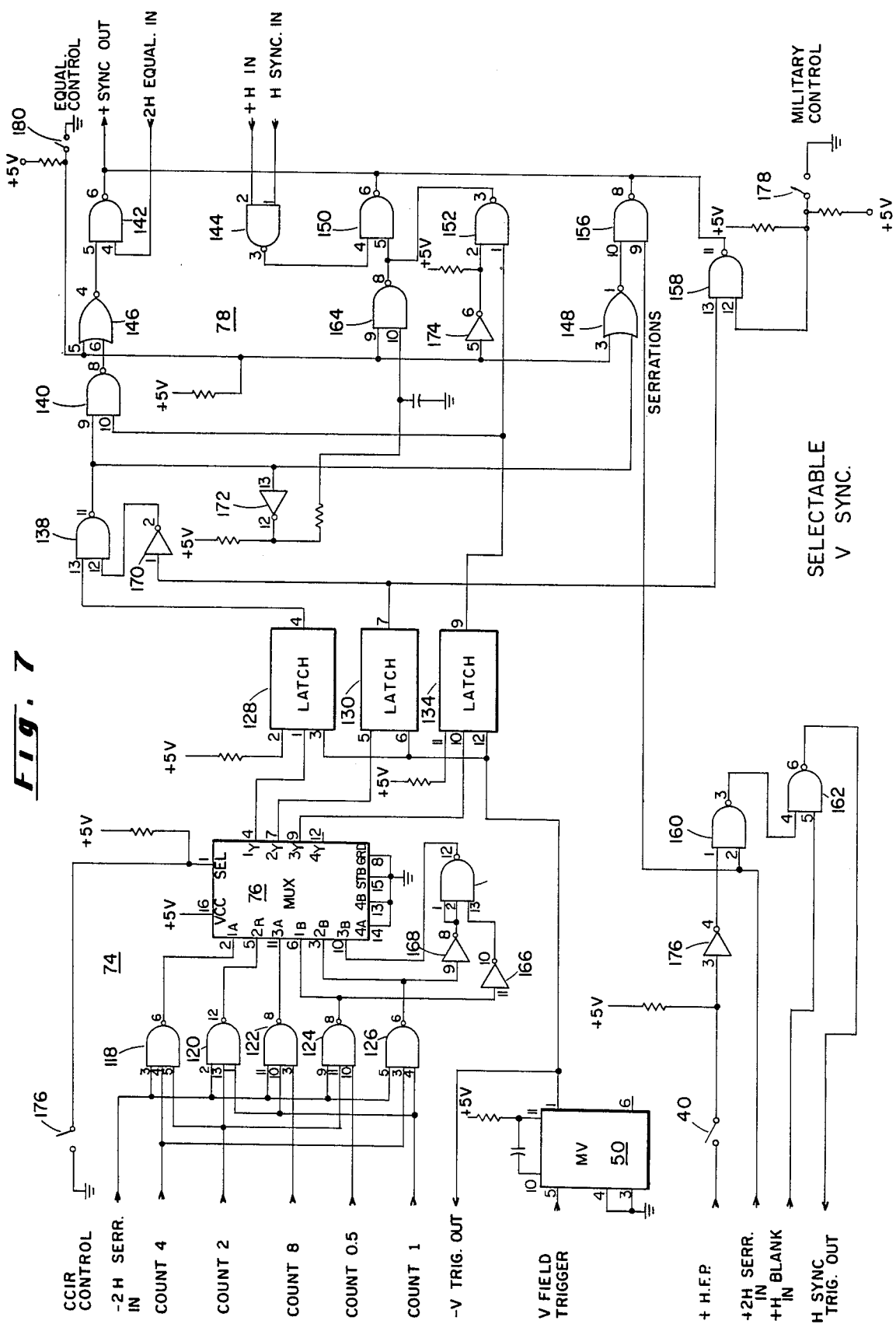
FIG. 7 is a schematic diagram of the selectable V sync board.

Referring now to FIG. 7, a schematic diagram of the selectable V sync board is shown which includes V field trigger monostable multivibrator 50, gates 74, multiplexer 76, and logic circuit 78. In an actual physical embodiment of the selectable V sync board shown in FIG. 7, the following integrated circuits were employed:

| Gates 118, 120, 122, 124, 126 | 7410 |
| Multiplexer 76 | 745157 |
| Quad latch 128, 130, 134 | 74LS 279 |
| Gates 138, 140, 142, 144 | 7400 |
| Gates 146, 148 | 7402 |
| Gates 150, 152, 154, 156, 158 | 7403 |
| Gates 160, 162, 164 | 7400 |
| Inverters 166, 168, 170, 172, 174, 176 | 7404 |

It will be understood that with CCI control switch 176 closed, the industrial format of the composite sync is provided as shown on FIG. 1F, and with the military control switch 178 closed, the military format of sync is provided as shown in FIG. 1E.

Figure 8:
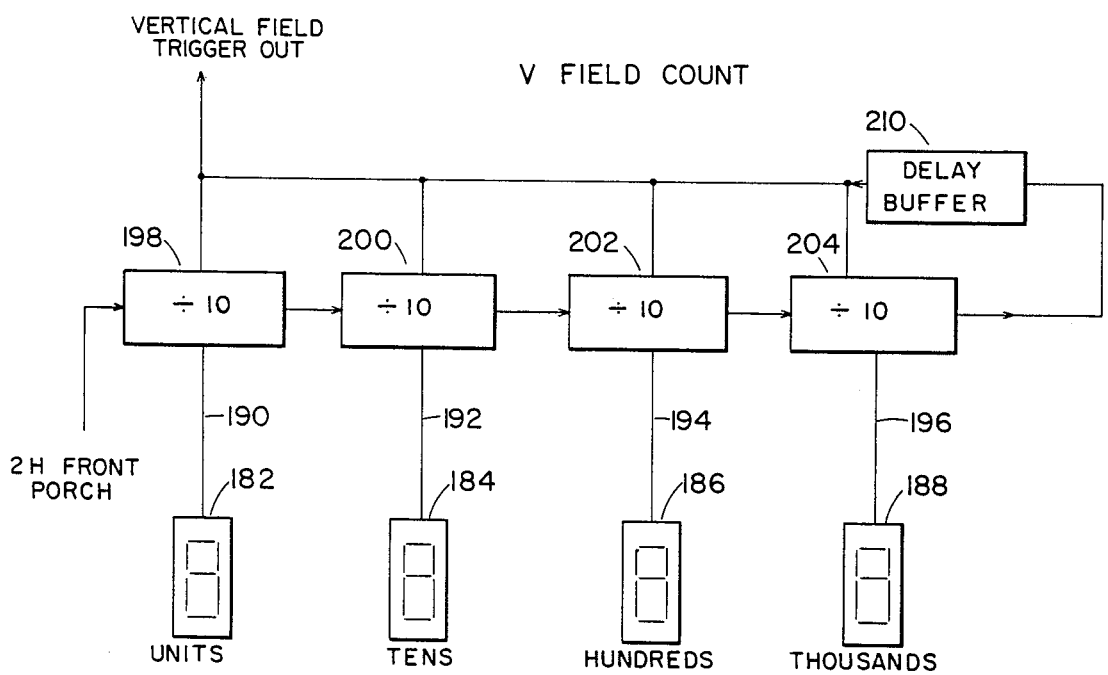
FIG. 8 is a simplified schematic block diagram of the V field count board.

Referring now to FIG. 8, the V field count board is schematically shown with units, tenths, hundreds and thousands thumbwheel switches 182, 184, 186 and 188 comprising the scanning lines for two fields selector switches 46. As in the case of the length of line selector switches 16, the scanning lines for two field selector switches 46 convert the number of scanning lines for two fields selected to binary coded form in their output circuits 190, 192, 194 and 196. The 2H front porch pulses are counted down by counters 198, 200, 204 and 206, which compare the binary coded number of scan lines per two fields selected by the selector switches 46 with the 2H front porch pulses counted to provide the vertical field trigger pulses.

Figure 9:
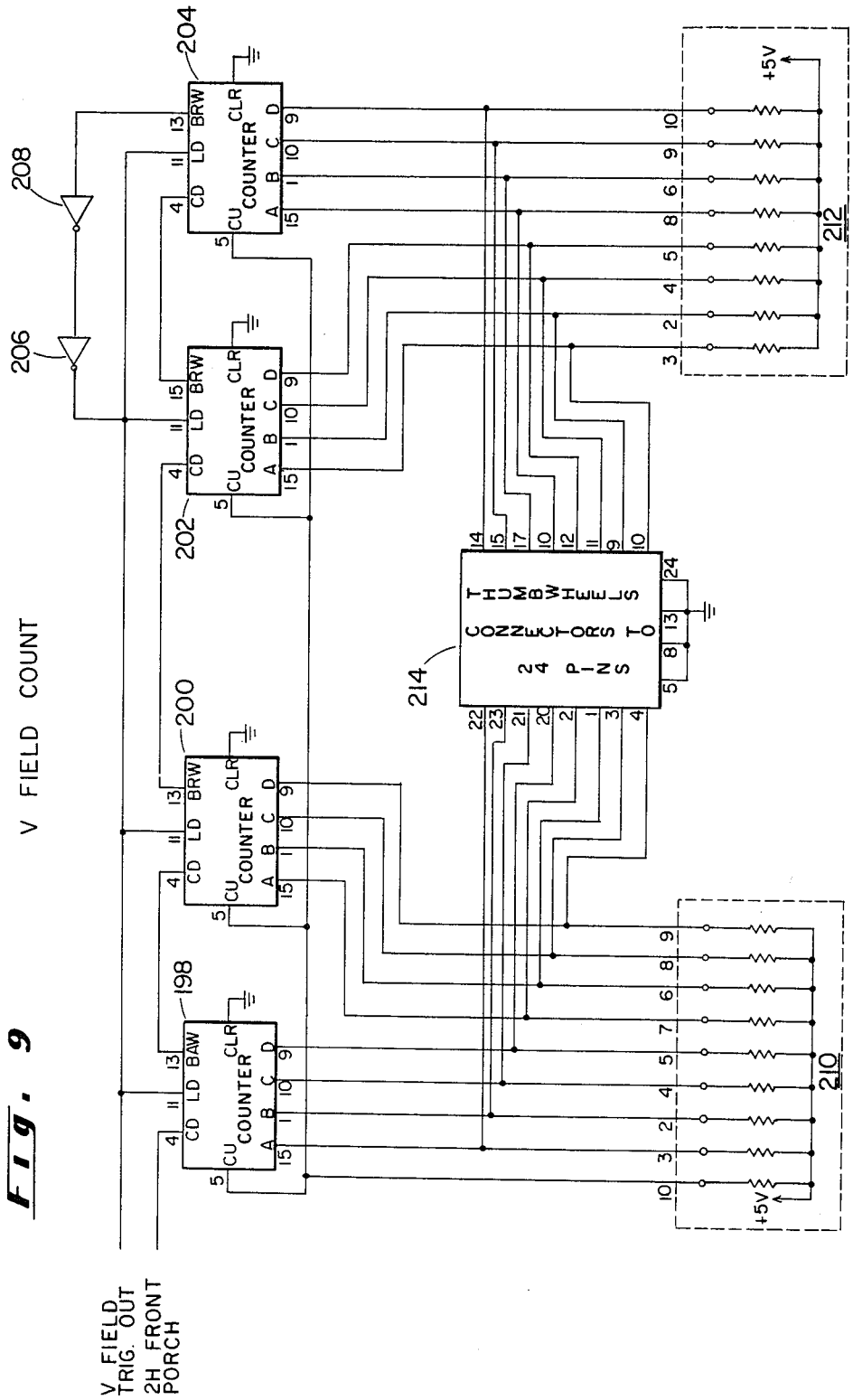
FIG. 9 is a schematic diagram of the V field count board.

Referring to FIG. 9, now there is shown the schematic circuit of the V field count board used in an actual physical embodiment of the system of the invention in which the following integrated circuits were used:

| Counters 198, 200, 202, 202 | 74192 |
| Inverters 206, 208 comprising | 7404 |
| Delay buffer 210 (FIG. 8) | |
| Resistor network 210, 212 | 1K |

It will be understood that thumbwheel switches 182, 184, 186 and 188 are connected to connector 214 by a suitable mating connector.

Referring now to FIG. 10 there is shown a schematic diagram for the pulse output board used for driving test pattern generator 24. The drivers shown in FIG. 10 are conventional and need not be further described.

The selectable rate sync generator of the invention develops precise synchronizing signals for use in industrial, educational and laboratory television applications. It will be seen that the wave form format is selectable, the broadcast format being in accordance with EIA Standard RS-170 in that it provides equalizing pulses and horizontal rate serrations in the vertical sync interval. This system meets all the requirements of Standards RS-3403, RS-170 and RS-330 for synchronizing signals. The industrial format meets the requirements of EIA Standards RS-330 and RS-343.

While there have been described above the principles of this invention in connection with specific apparatus, it is to be clearly understood that this description is made only by way of example and not as a limitation to the scope of the invention.

What is claimed is:

1. For use with a television test pattern generator, a selectable rate sync generator system comprising: master oscillator means having a predetermined frequency; means for selecting the desired total horizontal line time comprising a binary coded decimal selector having manually setable inputs, an indicator showing the total horizontal line time and a binary coded decimal output; means coupled to said oscillator means and to said selecting means for counting the cycles provided by said master oscillator means and comparing the cycle count with the binary coded decimal output of said means for selecting to generate a train of clock pulses having x times the repetition rate (xH) of the line time selected; means for generating H rate blanking and drive pulses of predetermined duration in response to said clock means; second means for selecting the desired number of horizontal scanning lines in x fields comprising a binary coded decimal selector having manually settable inputs, an indicator showing the number of horizontal scanning lines in x fields, and a binary coded decimal output; means coupled to said clock pulses generating means and to said second selecting means for counting said train of clock pulses and comparing the clock pulse count with the binary coded output of said second selecting means to generate vertical trigger pulses having the repetition rate (V) of the number of lines selected; means for generating V rate blanking and drive pulses of predetermined duration in response to said V trigger pulses; means for summing said H and V rate blanking pulses to provide a composite blanking signal; means for generating H rate sync pulses of predetermined duration in response to said clock pulses and delayed therefrom by a predetermined interval; means for generating V rate sync pulse having a predetermined duration in response to said V rate blanking pulses, and means for summing said H and V rate sync pulses to provide a composite sync signal.

2. The system of claim 1 wherein x is equal to 2.

3. The system of claim 1 wherein said clock pulses are front porch pulses at the 2H rate.

4. The system of claim 1 wherein said V blanking pulses are generated in response to the trailing edge of said V trigger pulses, and further comprising means for delaying said V sync pulses from the leading edge of said V blanking pulses by a predetermined V front porch interval.

5. The method of generating selectable rate television sync signals comprising the steps of: generating an alternating current signal of predetermined frequency; selecting the desired total horizontal line time by manually setting into a selector a binary coded decimal signal representative of the total H line time and indicating the selected total H line time; counting cycles of said alternating current signal; comparing the binary coded decimal signal for the total line time selected with the alternating current signal count and generating a train of clock pulses having twice the repetition rate (2H) of the line time selected in response thereto; generating H rate blanking and drive pulses in response to said clock pulses; selecting the desired number of horizontal scanning lines in two fields by manually setting into a selector a binary coded decimal signal representative of the number of horizontal scanning lines in two fields and indicating the selected number of scanning lines; counting said clock pulses; comprising the number of lines selected with the clock pulses count and generating vertical trigger pulses having the repetition rate (V) of the number of lines selected in response thereto; generating V rate blanking and drive pulses in response to said V trigger pulses; summing said H and V rate blanking pulses to provide a composite blanking signal; generating H rate sync pulses in response to said clock pulses and delayed therefrom by a predetermined interval; generating V rate sync pulses in response to said V rate blanking pulses; and summing said H and V sync pulses to provide a composite sync signal.

* * * * *